Nov. 10, 1953  E. E. MEUSY  2,658,514
GAS VALVE

Filed Dec. 21, 1949  3 Sheets-Sheet 1

Inventor
Eugene E. Meusy
By Hamilton Jones
Attorney

Nov. 10, 1953 E. E. MEUSY 2,658,514
GAS VALVE

Filed Dec. 21, 1949 3 Sheets-Sheet 3

Inventor
Eugene E. Meusy
By Ira Milton Jones
Attorney

Patented Nov. 10, 1953

2,658,514

UNITED STATES PATENT OFFICE 2,658,514

GAS VALVE

Eugene E. Meusy, Milwaukee, Wis., assignor to Milwaukee Gas Specialty Company, Milwaukee, Wis., a corporation of Wisconsin Application December 21, 1949, Serial No. 134,167

9 Claims. (Cl. 137—66)

This invention relates to gas valves and refers particularly to valves for controlling the supply of fuel to the burners and pilot lights of gas fired furnaces, wherein means are provided for automatically shutting off the gas supply to both in the event of pilot light failure.

While the valve of this invention is not limited in its use to any one particular type of furnace it is especially adapted for use with so-called floor furnaces. Such furnaces are installed directly below the floor, and usually the houses in which they are used have no basement. For this reason space is at a premium and invariably the furnace manufacturer allows very little space for the valve. The size of the valve is, therefore, very important. Obviously it is desirable that the valve be just as small and compact as possible. This poses a difficult problem especially where large capacity is another requirement.

The present invention is directed to a solution of this problem.

It is, therefore, an object of this invention to provide a gas valve of the character described which has considerably greater capacity for its size than valves heretofore available for this purpose.

To this end it is another object of this invention to provide a valve having a substantially straight-through flow characteristic, with its passages so defined as to assure smooth streamlined flow therethrough.

Another object of this invention is to provide a new and improved manner of incorporating the desired safety control latch mechanism in a valve of this type by which manufacture and assembly of the entire structure is facilitated, and the latch mechanism coacts with the shape and contour of the valve housing walls to effect streamlined flow of the gas through the valve.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figure 1:
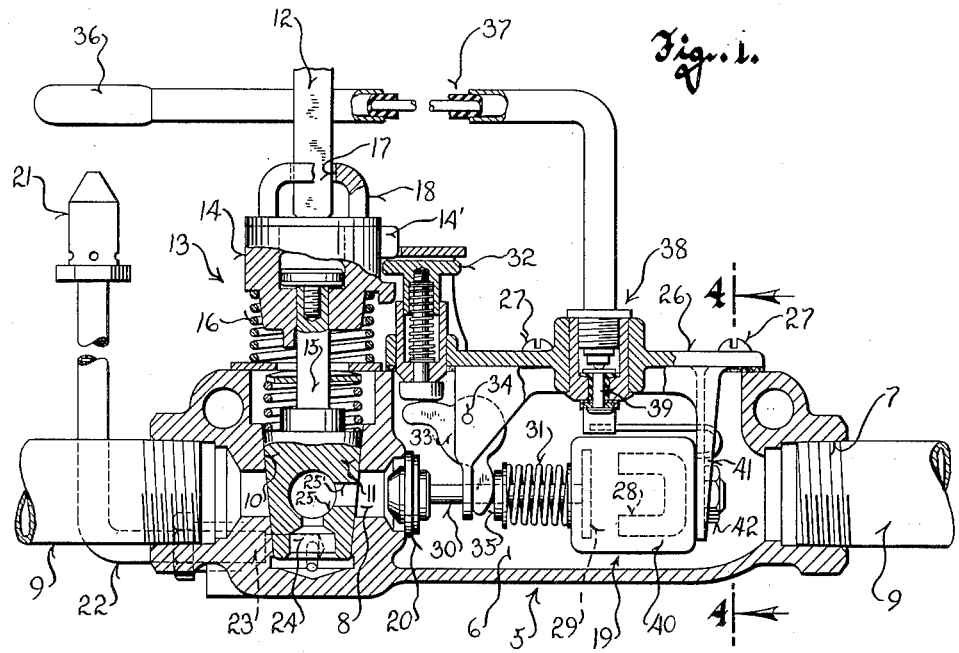
Figure 1 is a longitudinal sectional view through a valve embodying this invention, said view showing the safety valve closed.

Referring now particularly to the accompanying drawings in which like numerals designate like parts throughout the several views, the numeral 5 designates the housing or body of the valve which is preferably formed as a casting and is substantially elongated in shape. One end portion of the body defines an elongated hollow chamber 6 having an inlet 7 at one end and an outlet 8 at its other end, the inlet and outlet being in line with one another and both being provided with pipe taps so that the valve body may be connected in a pipe line 9.

Since the inlet and outlet are in line the entire valve when connected in the pipe line provides for straight-through flow, and when mounted horizontally as is the case where the valve is used in connection with floor furnaces, the vertical dimension or overall height of the valve can be held to a minimum.

The outlet 8 intersects a tapered vertical bore 10 opening to the top of the valve body, and in which a rotatable tapered plug 11 is received to control gas flow from the outlet. Rotation is imparted to the plug by a manually operable handle having a square stem 12 drivingly connected to the plug through a coupling indicated generally by the numeral 13. This coupling includes a driving head 14 slidably splined to the stem 15 of the valve plug and yieldingly urged upward to a defined position by a compression spring 16. The square stem 12 is removably connected to the head 14 by being received in a correspondingly shaped hole 17 formed in a yoke 18 which for all intents and purposes is an integral part of the head 14.

The axial movement of the head 14 is for the purpose of cocking an electromagnetic latch indicated generally by the numeral 19, and by which the safety valve 20 is held open as long as the pilot light for the burner which the valve controls remains lit. The pilot light burns at a jet or nozzle 21 to which fuel is supplied through a duct 22 which leads from a pilot supply port 23 in the side of the valve body.

Figure 2:
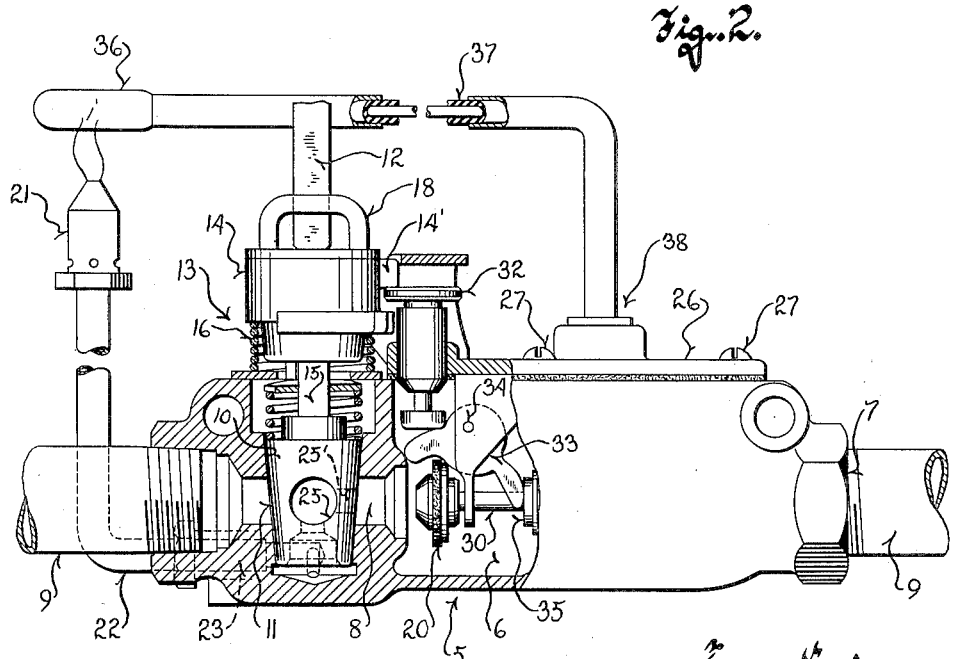
Figure 2 is a view similar to Figure 1, but showing the safety valve held open by the manually operable means for cocking its latch, and with the pilot light just lit.

The pilot supply port 23 is connected with the upstream side of the outlet passage 8 through a vertical port 24 which extends from the bottom of the tapered plug to a cross bore 25 and a branch 25' thereof. Thus in either the "burner on" position or the pilot-lighting position of the tapered plug 11 fuel is fed to the pilot light, providing, of course, that the safety valve 20 is open. Figures 1 and 2 show the tapered plug in its pilot-lighting or latch-cocking position, and Figure 2 shows the safety valve 20 being held open with fuel being fed to the pilot light. After the pilot light is lit the plug 11 may be turned to align its cross bore 25 with the outlet and thus permit fuel to flow to the main burner.

In the cocking position of the tapered plug the depressible head 14 is in a position of rotation at which depression thereof cocks the latch mechanism as will be hereinafter more fully described.

Figure 3:
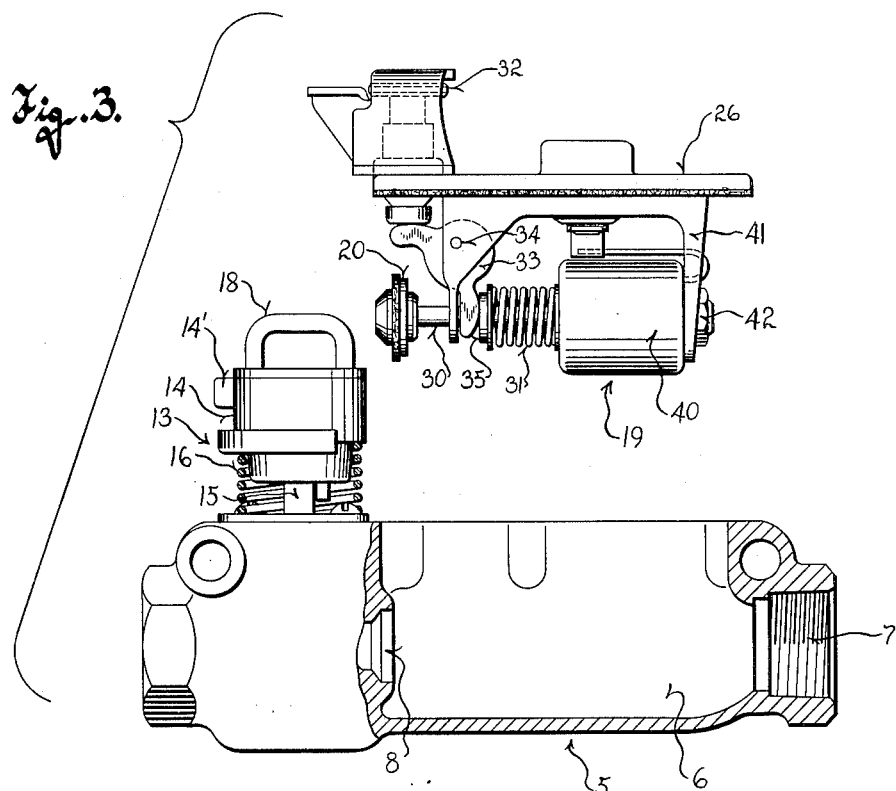
Figure 3 is a side elevational view of the valve housing and the safety valve assembly removed therefrom with parts of the valve housing broken away and in section, said view illustrating the ease with which the safety valve and its latch may be assembled and disassembled from the body.

The latch mechanism 19 and the safety valve 20 together constitute a sub-assembly which is readily removable from the valve body as shown in Figure 3. To permit such ready removal of this sub-assembly the chamber 6 is open at the top for its full length and width to be closed by a top plate 26 which is removably held in place by screws 27 and upon which the latch mechanism 19 is mounted.

The specific design and construction of the latch mechanism 19 forms no part of this invention. It may be of the type shown and described in Patent No. 2,126,564, issued to O. J. Leins August 9, 1938. In any event it is an electro-magnetically held latch and includes an electro-magnet 28 diagrammatically indicated in dotted lines in Figure 1 and a movable armature 29 adapted to be held to the pole faces of the electromagnet as long as current flows in its coil. The armature 29 is connected to the valve 20 through a valve stem 30 and a compression spring 31 encircling the stem 30 urges the valve to its closed position.

The valve may be unseated by depression of the head 14 providing the same is in its cocking position of rotation. When in its cocking position a lug 14' on the head 14 overlies a spring pressed plunger 32 which is slidably mounted in the top plate 26 with its lower end over one arm of a bell crank lever 33 pivoted as at 34 to a bracket at the underside of the plate 26. The other arm of the bell crank lever is bifurcated and straddles the valve stem 30. Hence, upon depression of the head 14 and consequent rocking of the bell crank lever, axial motion is imparted to the valve stem in a direction to unseat the valve, it being understood that the bifurcated lower arm of the bell crank lever bears against a collar 35 which is fixed to the valve stem.

The current necessary to energize the electromagnet is derived from a thermoelectric generator or thermocouple 36 positioned to be influenced by the heat from the pilot light and connected through a suitable conductor 37 with the coil of the electromagnet. The conductor 37 is conveniently attached to the top of the plate 26 as at 38 where contact is made through a suitably insulated connector 39 with the ungrounded side of the coil.

As will be readily apparent, during cocking of the safety latch effected by depression of the head 14 the armature 29 is brought home against the poles of the electromagnet 28 where it is held manually during the time the pilot light is lit and until the heat thereat generates sufficient current in the thermocouple to adequately energize the electromagnet. This cocks or engages the latch which thereafter holds the safety valve open until the pilot light goes out.

Figure 4:
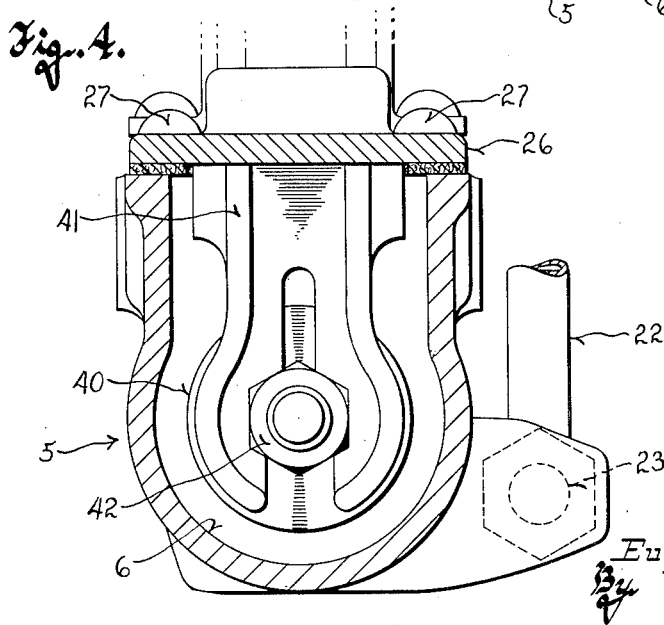
Figure 4 is a cross sectional view taken through Figure 1 on the plane of the line 4—4.

The electromagnet 28 and the armature 29 are enclosed within a cylindrical shell 40 which is coaxial with the valve and its spring 31, and it is to be noted that this cylindrical shell is larger than any other portion of the safety valve assembly. It is supported on the underside of the cover plate 26 by a depending bracket 41 to which it is secured by a clamping nut 42. This clamping nut is threaded on a screw extending from the adjacent end of the shell 40, and to allow adjustment of the shell toward and from the cover plate 26 the bracket 41 is bifurcated as clearly shown in Figure 4. This arrangement allows the latch mechanism to be accurately centered or aligned with the inlet and outlet 7 and 8, respectively.

With the latch mechanism, which may be referred to as an actuator or control for the safety valve, axially aligned with the inlet and outlet the cylindrical wall of its shell 40 is spaced from and substantially parallel to the sides of the chamber 6 for much of the cross section thereof. This positional arrangement together with the specific contour of the inside walls of the chamber 6 brings about an entirely unprecedented increase in capacity by streamlining the flow through the valve.

Since the brackets 41 which depend from the cover plate 26 and support the safety valve assembly are disposed in the upper portion of the chamber 6, they are largely out of the main path of the gas flow through the valve and thus do not seriously effect the flow pattern through the valve.

The contour of the inner walls of the chamber, the location of the latch device 19, and more particularly its cylindrical enclosure 40, and the shape of the underside of the valve disc 20 all coact to preclude turbulence, or at least reduce the possibility thereof to a minimum, and together guide and direct the flow through the valve. This is graphically illustrated in Figure 5.

With respect to the contour of the inner wall surfaces of the chamber it is important to observe that the inlet 7 which is considerably smaller in diameter than the cross sectional area of the chamber 6 is gradually merged with the inner side walls of the chamber by the gradually expanding cross sectional area of the chamber obtained by curving the adjacent side walls with a relatively long sweeping arc 45. This long radius fillet precludes setting up a turbulence at the point the inlet debouches into the chamber which would be the case if the inlet opened abruptly into the chamber 6, or, in other words, if the end wall of the chamber in which the inlet is formed were joined with the side walls of the chamber with a substantially square or almost square corner.

The long sweeping arc of the fillet 45 is struck with a radius R whose center is adjacent to the upstream end of the cylindrical enclosure 40 of the latch device so that the point of tangency between the fillet and the sides of the chamber is closely adjacent to or directly opposite the upstream end of the enclosure 40; and the cylindrical wall of this enclosure, as indicated hereinbefore, is substantially parallel to the major portion of the chamber side wall, at least that part thereof which defines the bottom and sides of the chamber. Thus the enclosure 40 coacts with the gradually enlarging cross section of the chamber effected by the fillet or curved walls 45 and the side walls of the chamber downstream therefrom to direct the flow along the sides of the chamber as indicated by the arrows in Figure 5.

At the outlet end of the chamber a curved wall 46 embracing the mouth of the outlet smoothly directs the gas flow inwardly and rearwardly toward the underside of the valve disc 20 where a substantially conical projection 47 redirects the flow forwardly into the mouth of the outlet. The curved surface 46 concentrically encompasses the mouth of the outlet 8 and results in a rearwardly projecting boss 48 the extreme rear edge of which provides the valve seat 49 with which the valve disc 20 coacts.

Figure 5:
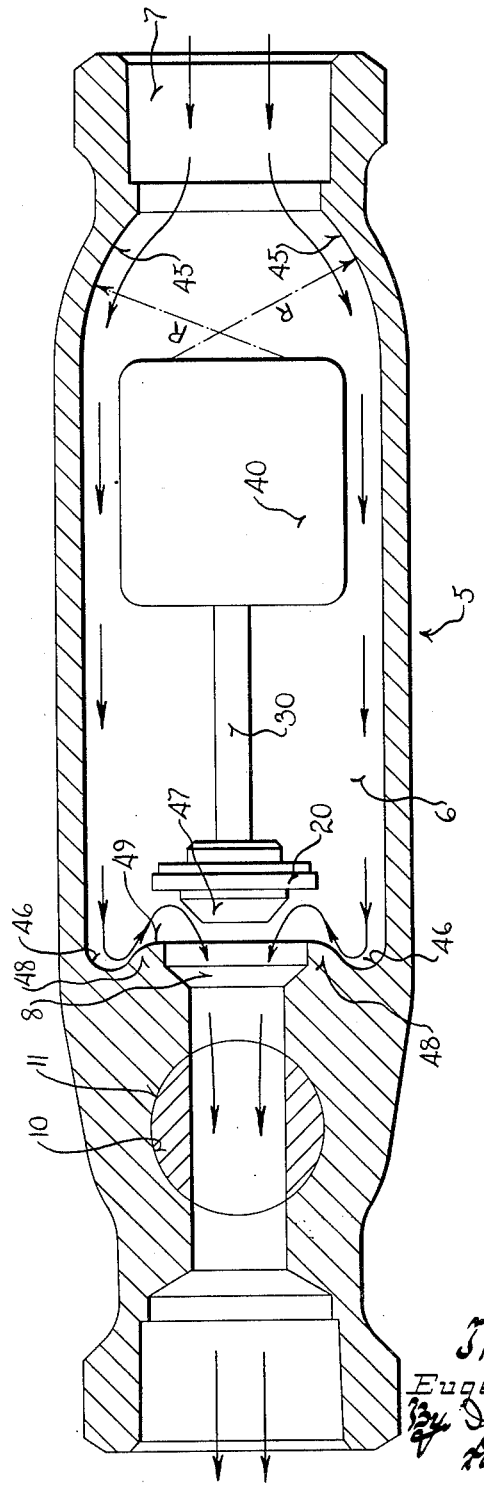
Figure 5 is a more or less diagrammatic view illustrating the flow pattern through the valve.

It has been definitely established that without the valve disc and its conical projection 47 in position as shown in Figure 5, that is, with the valve disc entirely removed from the chamber, the capacity of the valve is materially reduced since a turbulence inevitably results at the outlet end of the chamber.

Comparative tests between the valve of this invention and the predecessor construction, which was similar to that shown in the aforesaid Leins Patent No. 2,126,564 except that the outlet of the valve shown in that patent was further controlled by a rotatable tapered plug, displayed a phenomenal increase in capacity per unit size. The salient points of this comparison are as follows:

With a valve of the old style using a cross hole in the rotatable tapered plug of 7/16 inch in diameter and with the inlet and outlet tapped for the reception of ½ inch pipe, the capacity was approximately 70,000 B. t. u. per hour at ½ inch pressure drop.

With the valve of this invention and using a ⅜ inch cross hole (1/16 inch smaller) in the tapered plug and having the same size latch mechanism, the same size valve disc and valve seat, and the same size inlet and outlet, the capacity was approximately 81,000 B. t. u. per hour at ½ inch pressure drop.

And by increasing the body diameter, that is, the transverse dimension, of the chamber 6 one-eighth of an inch, and increasing the cross hole in the tapered plug to 7/16 inch, but in other respects retaining the same dimensions, a capacity of approximately 124,000 B. t. u. per hour at ½ inch pressure drop was realized. In other words, there is approximately a 7 to 12 ratio increase over previous structures.

As pointed out hereinbefore, this remarkable increase in capacity is due to the particular relationship of parts and the contour of the valve chamber together with the fact that the entire valve is designed for substantially straight-through flow. This arrangement also permits holding the vertical dimension of the valve to a minimum and in all respects satisfies the demand for increased capacity without sacrificing desirable small overall size.

What I claim as my invention is:

1. In a valve mechanism of the type having a hollow body defining a substantially elongated chamber with an inlet at one end thereof, an outlet at the other end thereof, and a valve seat at the mouth of the outlet, said chamber having one side thereof open for substantially its entire length and width: a cover plate for closing the open side of said hollow body; a bracket on the underside of said cover plate and extending down into the interior of said hollow body when the cover plate is installed on the body; a valve comprising an elongated stem mounted on said bracket for endwise sliding motion parallel to the length of the body and a disc-like head at one end of the stem adapted to be carried into and out of seating engagement with said valve seat in consequence to endwise reciprocation of the stem; means, including an electromagnet adjacent to the other end of said stem, carried by said bracket, for holding the disc-like head of said valve out of seating engagement with the valve seat as long as the electromagnet remains energized; a plunger mounted in said cover plate for endwise reciprocation transverse to the cover plate and to the valve stem; and means including a bell crank carried by said bracket for translating reciprocation of said plunger in one direction into endwise unseating movement of said valve.

2. The valve mechanism of claim 1, further characterized by a valve plug rotatably seated in a bore intersecting the outlet passage and having its port substantially coaxial with the inlet and outlet passages of said body and with said valve, to thereby provide for control of fluid flow through the body independently of said valve, while permitting substantially straight-through flow of fluid in the "open" position of rotation of the valve plug.

3. The valve mechanism of claim 2, further characterized by a driving head slidably splined to the valve plug to rotate therewith; and by a lug on said driving head engageable with said plunger in the "closed" position of rotation of said valve plug to constrain the plunger to move endwise with said driving head.

4. In a valve mechanism: a hollow valve body defining an elongated chamber having substantially coaxial openings at the opposite ends thereof and a valve seat at the mouth of one of said openings facing the interior of the chamber, one of said openings comprising an elongated passage, said chamber having one side thereof open; a removable cover closing said open side of the chamber; a valve assembly including a valve disc and an electromagnetic latch mechanism operable to hold the valve disc off its seat, said valve assembly being of a size to be readily passed through said open side of the chamber; means mounting the valve assembly from the underside of the cover so that upon placement of the cover in position the valve assembly is wholly within said chamber, said mounting means positioning the valve assembly intermediate the ends of the chamber and spaced from the cover and the walls of the chamber with the valve disc slidably supported for axial movement between a closed position seated upon the valve seat and an open position spaced therefrom; a valve plug rotatably seated in a bore in the body intersecting said elongated passage and having its port coaxial therewith in the "open" position of rotation of the plug; a plunger mounted for endwise reciprocation transversely to the axis of said openings and having one end portion thereof projectable into the chamber; means in said chamber for connecting the plunger with the valve disc and thereby translating endwise movement of the plunger in one direction into movement of the valve disc to an open position; and common drive means for selectively rotating the valve plug or actuating said plunger.

5. The valve mechanism of claim 4 further characterized by the fact that said valve body and said plunger are mounted adjacent to one another with their axes parallel; and by a driving head slidably splined to the valve plug to rotate therewith and having a lug engageable with the plunger in the "closed" position of rotation of the valve plug, so that said plunger is constrained to move endwise in said one direction with said driving head in said position of the valve plug.

6. In a valve mechanism: a hollow valve body defining an elongated chamber having substantially coaxial ports at the opposite ends thereof and a valve seat at the mouth of one of said ports facing the inside of the chamber, said chamber having one side thereof open; a valve assembly including a valve disc and an electromagnetic latch mechanism operable to hold the valve disc off its seat, said valve assembly being of a size to be readily passed through said open side of the chamber; means for supporting the valve assembly wholly within said chamber intermediate the ends thereof and with the valve disc slidably mounted for axial movement between a closed position seated upon the valve seat and an open position spaced therefrom; a cover removably secured over said open side of the chamber for closing the same; said supporting means for the valve assembly holding the same spaced from the cover and the walls of the chamber so that fluid flowing through the valve body passes around said valve assembly; a plunger mounted for endwise reciprocation transversely of the axis of said openings and having one end portion thereof projectable into said chamber; and means in said chamber for connecting said projectable end of the plunger with the valve disc and thereby translating endwise movement of the plunger in one direction into sliding movement of the valve disc to an open position spaced from the valve seat.

7. The valve mechanism of claim 6 further characterized by the fact that the valve body has an elongated passage leading from one of its ports, and a valve plug rotatably seated in the body and intersecting said passage to control flow therethrough; and further characterized by the provision of a manually operable driving head slidably splined to the valve plug to provide means for turning the plug while enabling the driving head to be moved axially; and means on said driving head positioned to engage said plunger when the valve plug is in its "closed" position of rotation and thereby enable sliding movement of the driving head in one direction to be transmitted to the plunger.

8. An electromagnetically controlled valve assembly adapted for installation as a unit in a confined space, comprising: a carrier plate; spaced front and rear brackets projecting from one side of the carrier plate, the front bracket having a bearing axially parallel with and spaced from the carrier plate; a casing containing an electromagnet and an armature, said casing having a front wall provided with a bearing opening to the interior of the casing and in line with the electromagnet therein; a valve having a stem slidable in said two bearings with one end portion of the stem inside the casing and connected to the armature; means mounting the casing upon the rear bracket with its front wall facing the the front bracket and with the bearing in its front wall coaxial with the bearing in the front bracket; a collar fixed to the valve stem between the two bearings; a bell crank pivoted upon the front bracket with one arm thereof adjacent to the carrier plate and its other arm bearing against said collar at the side thereof which faces the bearing in the front bracket; a valve spring encircling the valve stem and confined between the collar and the front of the casing, said spring biasing the armature away from the electromagnet; and an actuator carried by and passing through the carrier plate and connected with the adjacent arm of the bell crank for rocking the bell crank in the direction to move the valve stem against the spring and thereby bring the armature into seating engagement with the electromagnet.

9. The electromagnetic valve assembly of claim 8 further characterized by the fact that said actuating means comprises a plunger slidably mounted for axial movement along an axis substantially perpendicular to the axis of the valve stem with its inner end in position to bear against the adjacent arm of the bell crank and its outer end exposed on the opposite side of the carrier plate; a spring yieldingly urging the plunger axially away from the bell crank; and stop means limiting such spring produced motion of the plunger.

EUGENE E. MEUSY.

References Cited in the file of this patent

UNITED STATES PATENTS

| Number | Name | Date |
|---|---|---|
| 2,306,904 | Ray | Dec. 29, 1942 |
| 2,312,479 | Ray | Mar. 2, 1943 |
| 2,318,823 | Wantz | May 11, 1943 |
| 2,371,351 | Paille | Mar. 13, 1945 |
| 2,442,877 | Ray | June 8, 1948 |
| 2,477,078 | Mueller | July 26, 1949 |